VICTOR H. CLAUSEN
ARNOLD ZWEIG
INVENTORS

BY Seed & Berry

ATTORNEYS

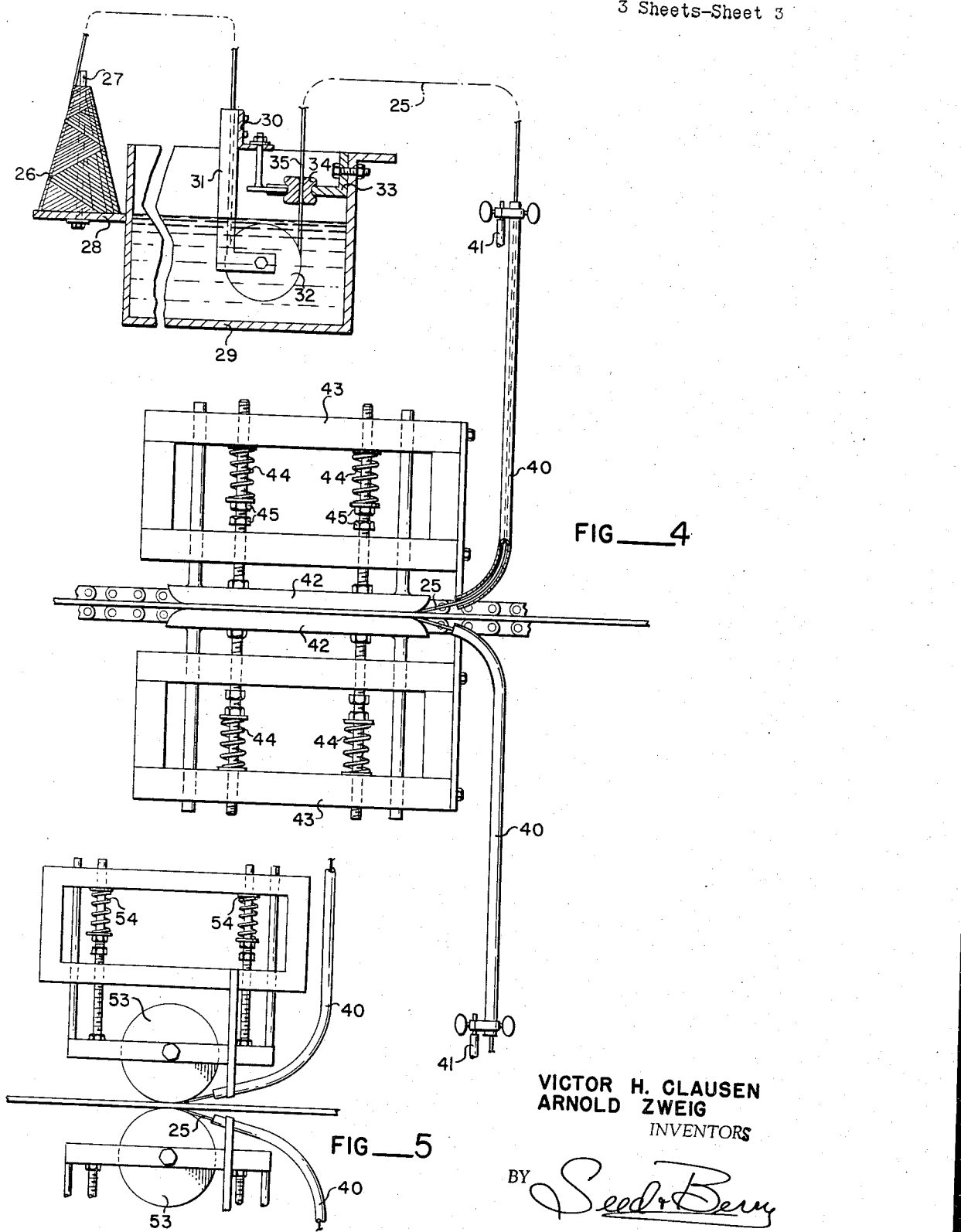

United States Patent Office 3,377,223
Patented Apr. 9, 1968

3,377,223
COMPOSITE WOOD VENEER AND MEANS FOR PRODUCING SAME
Victor H. Clausen, Bellevue, and Arnold Zweig, Olympia, Wash., assignors to Simpson Timber Company, Seattle, Wash., a corporation of Washington
Filed Dec. 19, 1963, Ser. No. 331,893
9 Claims. (Cl. 156—166)

The present invention relates in general to the formation of wood veneers and more particularly to an improved wood veneer product and means, including method and apparatus, for the production of such veneer.

A need exists in industries such as plywood making, wood container fabrication and general construction, for wide dimensioned wood veneers such as the elongated ribbon taken from a peeler log. As is often the case, however, the ribbon produced from a peeler log splits and separates to form relatively narrow widths of waste veneer or must be cut in narrow strips to eliminate such defects as pitch pockets, knots, checks, cracks etc. which would render the veneer unsightly or so weaken the veneer to render it unsuitable for use. Several methods are available in the prior art for joining narrow width veneer pieces for obtaining composite sheets and include such expedients as edge gluing and seam taping. Edge gluing, although a relatively expensive and wasteful operation, is perhaps the most commonly used method of joining wood veneer.

In the production of plywood panels, which is by far the largest single use of wood veneer, the practice is either to make up individual core layers of unjoined veneer pieces or to utilize the expedient of edge gluing to unify the veneer pieces prior to assembling the panel. The first of these practices results in which is known as "core gaps" between the individual veneer pieces which is objectionable in reducing the strength of the plywood panel, causing unsightly edges, providing avenues of water penetration, poor bonding and poor nail holding ability. As mentioned before, edge gluing is expensive and wasteful since each edge of each veneer piece must be jointed to obtain true and even surfaces for edge gluing, secondly, large amounts of wood veneer must be thrown away since knot holes or other blemishes along the edges to be joined must be entirely removed to effect an edge bond, and thirdly, it requires expensive labor. Methods of edge joining wood veneers which involve the use of taping the entire butt joint or seam between pieces of inner plies of veneer are generally not used in the plywood industry since the existence of the taping material within the glue lines of the finished panel weakens the bond and hence destroys the strength of the overall panel.

As mentioned, the uses of wide dimension veneer are not limited to the plywood industry, one other outstanding use being that of constructing wood containers and the like. In this particular use, it is customary to cover either one or both sides of the wood veneer with a material such as craft paper to increase its strength and improve its appearance. The expedient of edge gluing for veneers of this type has the disadvantage of being expensive in a product which is designed for cheap construction. The use of seam taping in container construction is objectionable since it is also expensive and the wood veneer has very little tensile strength at the taped seam other than strength of the tape itself, which is usually paper.

It may thus be appreciated that there is a definite need for a low cost high strength composite veneer product.

The present invention provides such a veneer product wherein no edge jointing is required and wherein veneer pieces may be joined to form a composite veneer panel regardless of the roughness of the veneer pieces. The present invention also presents a unique method and apparatus for producing the product.

One object of the present invention is, therefore, to provide a method for joining individual veneer pieces in tight edge-to-edge relation by the application and bonding of a low cost, high strength, continuous strand to the surfaces of the veneer pieces.

Another object of the present invention is to provide a method for joining veneer pieces involving the steps of bonding high tensile strength untwisted strands to the surface of the veneers while holding them in tight edge-to-edge relation.

Another object of the present invention is to provide a method for joining veneer pieces involving the steps of bonding a high tensile strength substantially untwisted strand while holding the pieces in tight edge-to-edge relationship with the utilization of a thermoplastic adhesive and wherein the strands are pressed into a flattened configuration on the surface of the veneer pieces simultaneously with the setting of the thermoplastic adhesive.

A further object of the present invention is to provide a composite wood veneer product made up of a plurality of edge-to-edge veneer pieces joined together and held solely by a plurality of high strength, continuous substantially untwisted strands bonded to the surfaces of all of the veneer pieces.

A further object of the present invention is to provide a composite wood veneer product of the type described wherein the strands comprise substantially untwisted fiber glass filaments flattened and bonded to the surface of the veneer pieces whereby plywood panels may be constructed without interference of the fiber glass strands with the glue line.

A further object of the present invention is to provide a veneer joining device for continuously applying a substantially untwisted strand of high tensile strength material to the surfaces of veneer pieces and simultaneously bonding said strand with thermoplastic adhesive and flattening said strand on the surfaces of the veneer pieces.

A still further object of the present invention is to provide a device of the type described which includes means for saturating the untwisted strands with thermoplastic adhesive, heating said adhesive with electrical resistance and subsequently cooling and setting the adhesive simultaneously with the flattening of the strand on the surfaces of the veneer pieces.

The means by which the foregoing objects and other advantages are accomplished are set forth in the following specifications and drawings wherein:

FIG. 4 is an enlarged detail of the strand applying device of the present invention taken along lines 4—4 FIG. 2; and FIG. 5 is a detail view of an alternate embodiment of the strand applying device.

Figure 1:
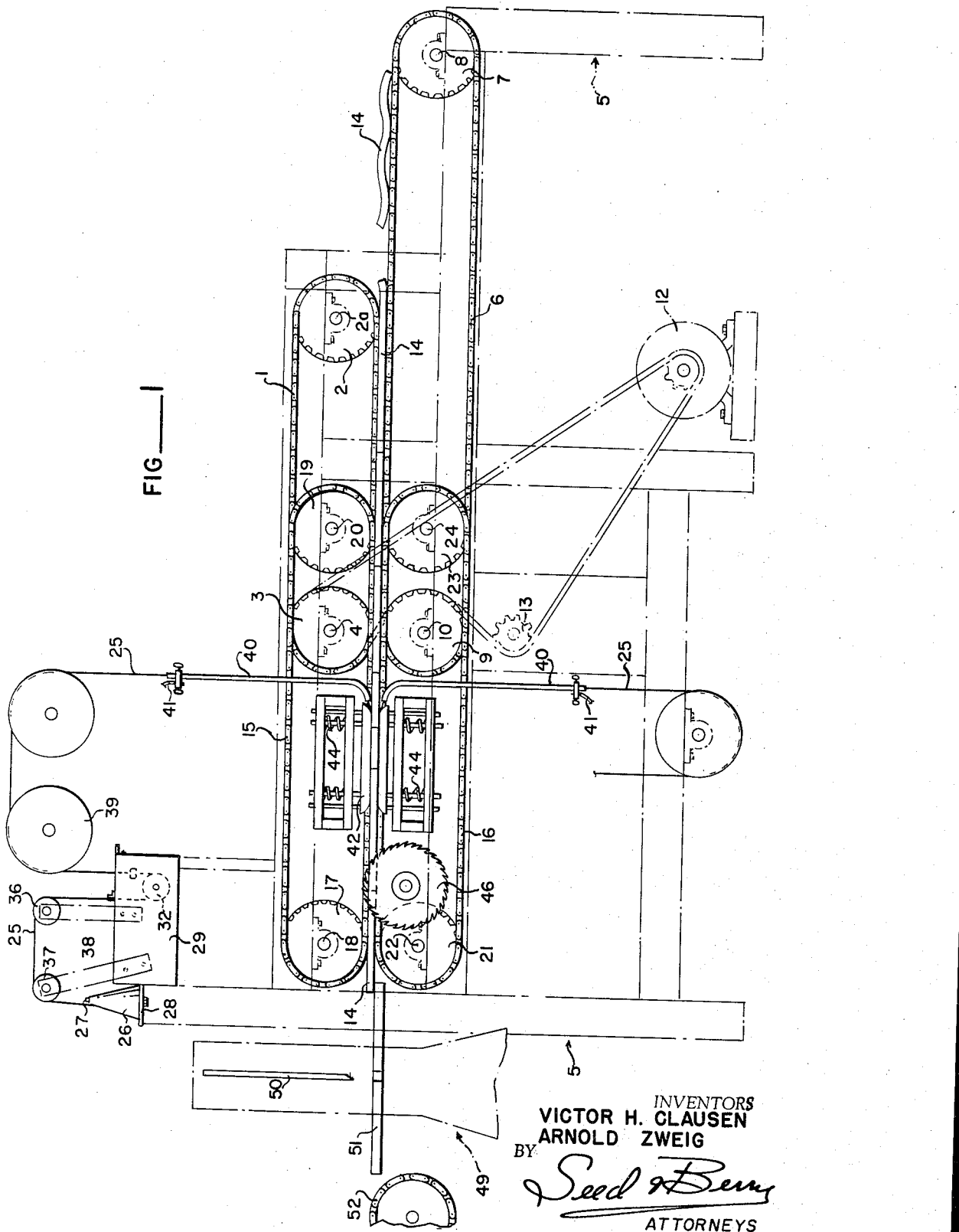
FIG. 1 is a schematic side elevation of the veneer joining device.

Referring now to the drawings, wherein like reference numerals indicate identical parts in the various views, the apparatus for producing the product of the present invention and for accomplishing the method steps involved includes a basic unit well known to the wood veneer industry as a "crowder." The crowder functions to move individual pieces into tight edge-to-edge abuttment and to maintain the veneer pieces in this condition until some joining operations, such as edge joining with an adheseive is completed. The crowder shown by way of illustration in the drawings is an endless chain crowder which comprises laterally spaced endless top chains 1 trained about a first row of spaced sprockets 2 carried on a transverse shaft 2a, and a second set of sprockets 3 spaced along the transverse shaft 4. The transverse shafts 2a and 4, and other structures to be described for the crowder device, may be supported by any suitable framing structure indicated generally at 5.

An identical set of spaced endless chains 6 are located directly beneath and in vertical alignment with the endless chains 1. The chains 6 are trained about a first set of sprockets 7, mounted on the shaft 8, and a second set of spaced sprockets 9 mounted on a transverse shaft 10. The top chains 1 and the bottoms chains 6 may be driven conjointly by means of a suitable drive chain 11 powered by the motor 12. The chain 11 passes about an idler sprocket 13 and engages a sprocket, not shown, on the transverse shaft 10 to drive the shaft and the chain 6 in the counterclockwise direction as viewed in FIG. 1, and then about a sprocket, not shown, on the shaft 4 to drive the shaft and the chain 1 in the clockwise direction. As shown in FIG. 1, the chains 1 and 6 are spaced a sufficient distance apart to allow them to engage and convey individual pieces of wood veneer 14 therebetween. In practice, the distance between the upper and lower sets of chains is adjustable and means will be provided to maintain a slight bit of pressure between the chains and the surfaces of the veneer pieces.

The crowding or pressuring of the veneer pieces into tight edge-to-edge contact is accomplished by the means of a third set of upper chains 15 and a fourth set of lower chains 16 which overlap the ends of the chains 1 and 6 as shown clearly in FIG. 1. The top chains 15 are trained about sprockets 17, fixed to the transverse shaft 18. The shafts 18 and 20 may be journaled by any suitable means within the overall frame structure 5.

The bottom chains 16 are trained about sprockets 21, fixed to transverse shaft 22, and sprockets 23, fixed to transverse shaft 24, with the shafts 22 and 24 being likewise journaled in the frame structure 5. The sets of chains 15 and 16 are driven in the same relative directions as the chains 1 and 6 respectively by the veneer pieces 14 therebetween as they are forced through by chains 1 and 6. The chains 15 and 16 will also be adjustably pressured against the veneer pieces 14 in order to hold them flat. The crowding of the veneer pieces is accomplished by the driving action of chains 1 and 6 and the retarding action of chains 15 and 16. Thus, the veneer pieces are tightly abutted and maintained in this position while they are between the chains 15 and 16.

According to the present invention, means are provided in combination with the crowder structure described for bonding strands of a high tensile strength material at a plurality of positions on both the upper and lower faces of the veneer pieces 14 passing through the crowder device. For the purpose of this invention, the term "strand" is used in its broad sense as meaning a thread-like construction composed of a plurality of filaments or fibers or a plurality of thread-like units made up of multiple ends or filaments. In its broadest sense, the invention contemplates the use of any material in strand form, as defined, which exhibits a relatively high degree of tensile strength, in strand form, and is capable of being pressed or flattened on a wood veneer surface for a purpose to be described. In practice it has been found that strands of material which can be characterized as substantially "untwisted," i.e. strands of "bunched" or "grouped" threads or filaments best meet these requirements.

One type of material which has been utilized to accomplish the objects of the present invention comprises a substantially untwisted continuous strand of fiber glass, made up of twelve "ends" or units of filaments with each unit containing 204 filaments. Fiber glass strands suitable for use in the present invention are commercially available and the preferred fiber glass strand described would be termed in the art as "twelve end continuous roving." The use of fiber glass strands is preferred in accomplishing the objects of the present invention because of the low cost of the material and the high tensile strength exhibited by the single strands in an untwisted condition. Since the fiber glass strands are substantially untwisted, the material of the strand may be flattened out on the surface of the wood veneers thus offering very little interference with the glue line of a plywood panel or any other material laminated to the surface of the veneer pieces. Although twisted fiber glass strands may be used in connection with the present invention, the advantages gained by flattening the strands, as described in the preferred embodiment, will not be wholly obtained.

Through investigation, it has been discovered that veneer pieces joined with continuous and untwisted flattened fiber glass strands exhibit far superior tensile strength characteristics to veneer pieces joined by edge gluing or seam taping since the fiber glass strands are bonded across the entire width of each individual veneer piece and thus prevent splitting of the wood veneer which is usually weaker than the edge glued portion or taped seam. In addition to the added strength obtained with the fiber glass material, it has been found that plywood panel may be formed with the flattened fiber glass strand in the regular glue lines with no loss of strength. In a finished panel, the thickness of the fiber glass strand within the glue line has been found to be approximately .005 inch and hardly ascertainable in the finished glue line. Shear testing of samples under standard testing procedures have indicated no loss of strength in the bond between the veneers attributable to the presence of the fiber glass strands, i.e. wood failure normally occurs before fiber glass or glue line failure.

Since fiber glass is the preferred material, the following description will be made with reference to fiber glass strands. Strands 25 may be supplied from a series of spools 26 located at any position adjacent the position shown in FIG. 1 above the crowder chains. Six such spools are illustrated in the drawings for a reason to be described, with each spool being freely rotatable on the post member 27 secured to any type of support bracket 28 carried by the frame 5 of the crowder.

Figure 2:
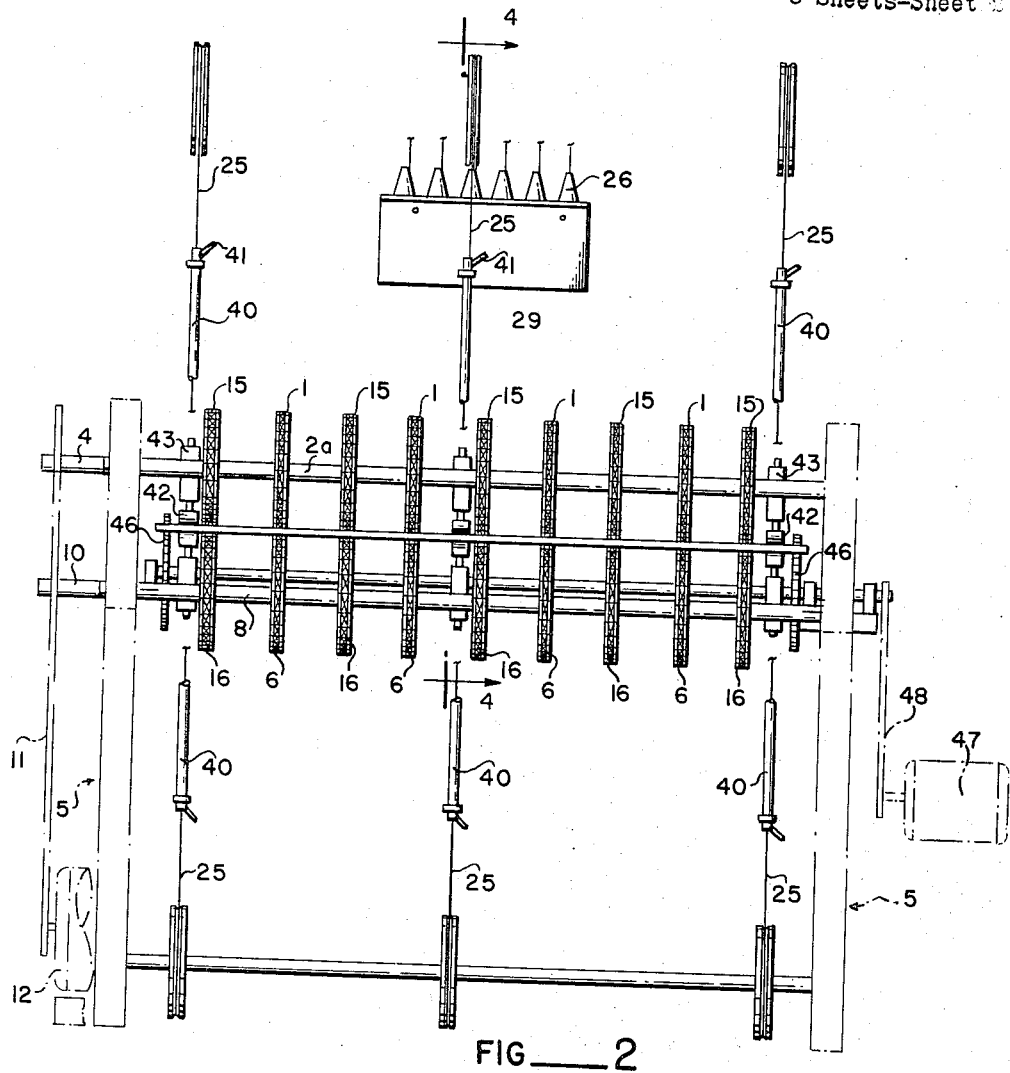
FIG. 2 is a schematic end view of the device shown in FIG. 1.

Mounted adjacent the spools 26 is a tank or vat 29, shown schematically in FIGS. 1 and 2 and in detail in FIG. 4. The tank may be fixed to the frame 5 of the crowder and is designed to carry a supply of thermo plastic or hot melt adhesive which may be any one of a wide variety of synthetic resins or other thermo plastic adhesives suitable for forming a strong bond between the fiber glass and a wood surface. It will be necessary to maintain the thermo plastic adhesive in the tank 29 in the liquid state for the purpose of saturating the fiber glass strand in a manner to be described.

Referring to FIG. 4, the tank 29 includes a first angle iron brace 30 for supporting a strand guide member 31 for each of the spools 26 with the guide members 31 also including a pulley 32 rotatably attached to its lower end. In addition, the tank 29 includes a transverse angle bracket 33 for mounting a plurality of grommets or eyelets 34 with a grommet provided in alignment with each of the pulleys 32. The grommets 34 may be constructed from Teflon or the like and are formed with an orifice 35 through which the fiber glass strand passes after it leaves the thermo plastic adhesive. The Teflon grommets 34 function as wiping orifices for the saturated fiber glass strands. In order to guide the strands from the spools 26 to the thermo plastic adhesives, each strand will be provided with pulleys 36 and 37 carried by any suitable support means such as the brackets 38 shown in FIG. 1. Each of the six fiber glass strands travels upwardly from its spool and then downwardly into the adhesive bath, around a pulley 32 and then upwardly through a wiping orifice 35 and about a suitable guide pulley 39 to be directed to its point of application to the wood veneer surface. It will be noted that the thermo plastic adhesive on each fiber glass strand quickly dries after the strand leaves the Teflon wiping orifice. The diameter of the orifice 35 determines the amount of adhesive metered onto the fiber glass strand and interchangeable Teflon grommets with various diameter orifices may be used.

According to the preferred embodiment of the present invention, three of the six fiber glass strands are placed on the top of the veneer pieces as they pass through the crowder and the remaining three strands are applied to the bottom surfaces of the veneer pieces at the same relative positions. The exact placement of the fiber glass strands and the exact number of strands used may be varied within the scope of the present invention depending upon the use for which the composite wood veneer is intended. The mechanical means for applying each individual strand is identical and hence only one such means will be described with reference to FIG. 4 for a strand applied to the top surfaces of the veneer pieces 14.

Referring now to FIG. 4 in detail, strand 25, saturated with the dried thermo plastic adhesive, passes through a tubular conduit 40 which is heated by electrical resistance by means of a lead wire 41 clamped to the tube. As the saturated strand 25 passes through the heated tube 40, the thermo plastic adhesive is melted to a flowable state so that the strand issuing from the tube 40 is ready to be applied and bonded to the surfaces of the veneer pieces 14. As the strand passes out of the end of the tube 40, it passes beneath the spring loaded shoe 42 carried by a frame structure 43, fixed by any means to the frame of the crowder machine. The shoe 42 is preferably made of metal or other good heat conducting substance to aid in the quick cooling and setting of the adhesive carried by the strand 25. It is also advisable to plate the contact surface of the metal shoe with chromium or the like to reduce friction.

The shoe 42 is spring pressed downwardly by means of the coil springs 44, the force of which may be made adjustable by means of screw members 45 as shown in FIG. 4. With this arrangement the strands 25 are flattened or spread out over the veneer surface to greatly reduce their thickness. It has been found in practice that the cooling effect and spreading action of the metal shoe 42 causes almost instant setting of the thermo plastic adhesive and a permanent bond is formed between the flattened fiber glass strand and the surface of the wood veneer by the time the strand emerges from beneath the shoe. As also seen in FIGS. 1 and 4, the application of the fiber glass strand is accomplished at a position along the crowder device where the veneer pieces 14 have been tightly pressured together to avoid any gaps. It will also be noted that feeding of the fiber glass strands 25 is automatically provided by the fact that the strands are bonded to the surfaces of the veneer pieces 14 as they move, thus pulling the strands 25 at the same rate of travel.

After the veneer pieces pass from the crowder they are held in tight edge-to-edge engagement by means of the multiple strands of fiber glass on both of their faces. It has been found that extremely tight edge joining may be accomplished by merely clipping the veneer pieces 14 rather than jointing such as is necessary in edge gluing. Another advantage of the present method of joining is that the presence of knot holes or the like along the edge of the veneer pieces or the roughness or unevenness of the veneer pieces does not interfere in any way with the joining operation.

As shown in FIGS. 1 and 4, a strand applying device such as described is located on both sides of the veneer pieces 14, and as shown in FIG. 2, three such strands may be applied on the top surfaces of the veneers and three strands may simultaneously be applied to the bottom surfaces of the veneer pieces. It may be desirable in some instance, to offset the two center strands as viewed in FIG. 2 on veneers intended to be used in plywood panels to obtain extra strength and to avoid having the fiber glass strands in alignment within the glue lines of the panel. If the veneers are intended for plywood layup, it is also desirable to provide a trimming saw 46 on both sides of the veneer pieces as they pass through the crowder to insure even edges and to avoid waste in the finished panel. The saws 46 may be conventional circular saws driven by an electrical motor or the like 47 through the chain or belt 48. It is preferable to locate the saws 46 approximately one-quarter of an inch on the outside of each of the end strands 25 in the case of veneers intended for plywood panel manufacture since final trimming of the finished panel would result in the removal of the fiber glass strand along the edges of the veneers thus eliminating all possibility of interference with the glue lines of the panel.

The crowder and fiber glass applying means may be followed immediately by a conventional clipper cutter indicated generally at 49 and having a blade 50 and table 51. The operation of the blade 50 could then by synchronized with the speed of the crowder conveyor to cut the endless ribbon of joined veneer pieces into the desired width for plywood production or the like. Any conveyor system 52 would then be used to remove the finished veneers.

In FIG. 5 an alternate form of strand applying device is illustrated for performing the function of the shoe 42. In this embodiment, a roller 53 is used instead of the flat shoe 42 for obtaining a positive point contact on the strand. The rollers 53 may be rotatably mounted in any suitable fashion and include spring members 54 for resiliently loading the rollers to effectively flatten the fiber glass strands. It has been found in practice that a metallic roller of approximately 6″ diameter will accomplish the results desired. Although the cooling effect of the roller is not as great as that of the shoes 42, it has been found that a satisfactory bond can be produced with the roller.

Figure 3:
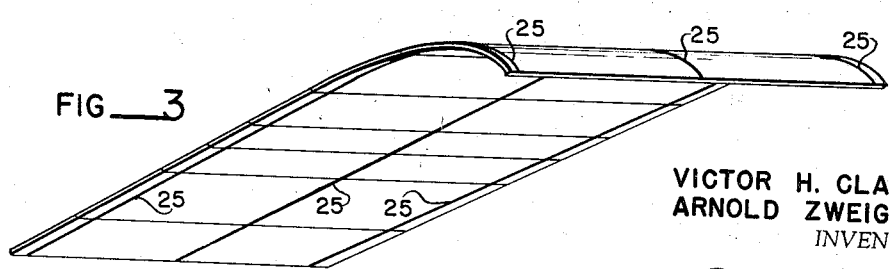
FIG. 3 is a perspective view of the product according to the present invention.

Turning now to FIG. 3, the finished product formed by the present invention is illustrated and constitutes a unique wood veneer product hitherto unknown in the art. As seen, the product comprises a single wood veneer sheet made up of individual veneer pieces 14 held in tight edge-to-edge abutting relation by a plurality of fiber glass strands 25 securely bonded to each face thereof by means of thermoplastic adhesive contained on the fiber glass material. Each fiber glass strand 25 is characterized as being substantially untwisted and flattened or spread out on the surface on the veneer pieces for reasons previously stated. The product is unique in the art in that it may be formed much more cheaply than by the process of edge gluing, seam taping or any other process known and yet exhibits more strength in the longitudinal direction than products made by known methods. This is important in uses of the veneer which requires handling of the entire width of each individual veneer piece prevents splitting of the veneer pieces which are, themselves, weak in this respect. In addition to these advantages, the fact that the fiber glass is untwisted and is spread out or flattened on the surface of the wood veneers renders the finished product usable for most proposes for which a unitary piece of wood veneer would normally be desired.

As previously mentioned, the composite wood veneer of the present invention is adapted for many uses as a final product for the manufactures of plywood panels, wood veneer containers and as a laminate in general.

From the foregoing description, it will be apparent to those skilled in the art that the present invention offers significant advances in composite wood veneer products and the method and apparatus for making the same. The arrangement and type of structural components and method steps utilized within this invention may be subject to numerous modifications well within the purview of this invention and applicant intends only to be limited to a liberal interpretation of the specifications and appended claims.

Having thus described the invention, what is claimed as new and desired to be secured by Letters Patent is:

1. The method of making a composite wood veneer which comprises: continuously conveying a plurality of veneer strips in close edge-to-edge abutting relation in a direction substantially perpendicular to the abutting edges, holding said strips in tight abutting relation while they are being conveyed, guiding a plurality of substantially untwisted continuous fibrous strands in spaced substantially parallel relation onto the surfaces of said strips perpendicular to and across the abutting edges and applying the strands to the veneer surfaces with thermoplastic adhesive, heating the thermoplastic adhesive to maintain it in a flowable state before the strands are guided onto the surfaces of the strips, and simultaneously flattening said strands on the veneer surfaces by the application of pressure while the adhesive is in the flowable state and producing a cooling effect to cause said adhesive to form a bond between the strands and the surfaces of the veneer strips, whereby said veneer strips are temporarily held together by said strands to form a composite veneer sheet suitable for plywood panel layup.

2. The method of joining wood veneer strips which comprises: continuously conveying a plurality of veneer strips in edge-to-edge abutting relation in a direction substantially perpendicular to the abutting edges, holding said strips in tight abutting relation while they are being conveyed, guiding a plurality of continuous, flexible and substantially untwisted fibrous strands of relatively high tensile strength having a thermoplastic adhesive applied thereto, in spaced substantially parallel relation, onto the surfaces of said strips perpendicular to and across the abutting edges thereof, heating said strand to bring said thermoplastic adhesive to a flowable state before it is guided onto the surfaces of the strips, and simultaneously flattening the untwisted strand on the veneer surface by application of pressure while the adhesive is in the flowable state and producing a cooling effect to cause said adhesive to form a bond between said strand and the surfaces of said veneer strips, whereby said veneer strips are temporarily held together by said strands to form a composite veneer sheet suitable for plywood panel layup.

3. An apparatus for bonding a plurality of continuous, flexible and substantially untwisted strands of relatively high tensile strength having a thermoplastic adhesive applied thereto to the surfaces of a series of moving veneer strips in edge-to-edge abutting relation comprising; means to convey said strips in close edge-to-edge abutting relation in a direction substantially perpendicular to the abutting edges, means to guide said strands onto the moving surfaces of said strip substantially perpendicular to and across the abutting edges there of and disposed in spaced substantially parallel relation, means to heat said thermoplastic adhesive to a flowable state before the strands are applied to the surfaces of the strips, and pressure means to press said untwisted fibrous strands onto the moving surfaces of the strips so as to flatten the strands while the adhesive is in the flowable state and to cause said adhesive to form a bond between the flattened strands and said veneer surfaces, whereby said veneer strips are temporarily held together by said strands to form a composite veneer sheet suitable for plywood panel layup.

4. In combination with a crowder mechanism having means to convey a plurality of wood veneer strips and means to pressure said strips in tight edge-to-edge relation over a given portion of travel, a veneer joining apparatus comprising; a source of continuous substantially untwisted fiber glass strands, means for coating said strands with a thermoplastic adhesive, means to direct said strands toward spaced locations on both surfaces of said strips during said given portion of travel, a guide tube surrounding each of said strands, each of said guide tubes having a curved terminal portion for guiding the associated strand on to the surfaces of said moving strips, means to heat each of said tubes to melt the adhesive coating on the associated strand, a fixed pressure member riding on the surface of said veneer strips closely adjacent the curved terminal portion of each said tubes, and means to resiliently bias said pressure members against said strands and the surface of said veneer strips, whereby said strands are flattened and said adhesive is cooled and caused to form a bond between said strands and the surfaces of said moving veneer strips.

5. The combination according to claim 4 wherein said tubes are heated by electrical resistance.

6. The combination according to claim 4 wherein said strands are bonded to the surfaces of said veneer strips at right angles to the grain of said strips and spaced inwardly from the ends thereof, and cutter means carried by said crowder mechanism for trimming at least one side of the composite veneer product joined by said strands.

7. An apparatus for bonding a continuous flexible strand to the adjacent surfaces of a series of moving veneer strips in edge-to-edge abutment comprising; means to coat said strand with a thermoplastic adhesive, first guide means for directing said strand toward the surfaces of said strips, a second guide means for directing said strand onto the surfaces of said moving strips, said second guide means comprising an elongated tube surrounding said strand and including a curved terminal portion adjacent the path of the surfaces of said strips, means to heat said tube to maintain said adhesive in a flowable state, and means for pressing said strand on the surfaces of said strips and to cause said adhesive to form a bond between said strand and said surfaces.

8. The device according to claim 7 wherein said means for pressing said strand comprises an elongated metallic shoe member mounted in a fixed position closely adjacent the curver terminal portion of said tube, and resilient biasing means for pressuring said shoe member against said strand and the moving surfaces of said veneer strips.

9. The device according to claim 7 wherein said means for pressing said strand comprises a cylindrical roller member, means to rotatably mount said roller member in a fixed position closely adjacent the curver terminel portion of said tube, and resilient biasing means for pressuring said roller member against said strand and the moving surfaces of said veneer strips.

References Cited

UNITED STATES PATENTS

| | | | |
|---|---|---|---|
| 2,428,325 | 9/1947 | Collins | 161—143 |
| 884,905 | 4/1908 | Dennis | 156—304 |
| 1,977,199 | 10/1934 | Osgood | 144—3.1 |
| 2,500,053 | 3/1950 | Andrews | 156—176 |
| 2,640,796 | 6/1953 | Langer | 156—176 |

DOUGLAS J. DRUMMOND, *Primary Examiner.*